July 22, 1924.

J. M. BRENNAN

MOTOR METER

Filed April 26, 1923

1,501,898

INVENTOR.
James M. Brennan
BY
G. O. Karpham
ATTORNEY.

Patented July 22, 1924.

1,501,898

UNITED STATES PATENT OFFICE.

JAMES M. BRENNAN, OF LOS ANGELES, CALIFORNIA.

MOTOR METER.

Application filed April 26, 1923. Serial No. 634,922.

*To all whom it may concern:*

Be it known that I, JAMES M. BRENNAN, a citizen of the United States, residing at the city of Los Angeles, county of Los Angeles, State of California, have invented new and useful Improvements in Motor Meters, of which the following is a specification.

My invention primarily relates to a device for determining when the temperature of an automobile engine is above safety temperature and the object thereof is to provide a device of that character with the portion thereof which contains the temperature indicating means that will be close to the driver where he can ascertain either day or night whether or not the temperature of his engine is above the safety point. A further object is to provide a device of that character which will indicate temperature in the engine and at the same time will reduce the amount of carbon usually deposited in the cylinders and will improve the fuel.

Figure 1:
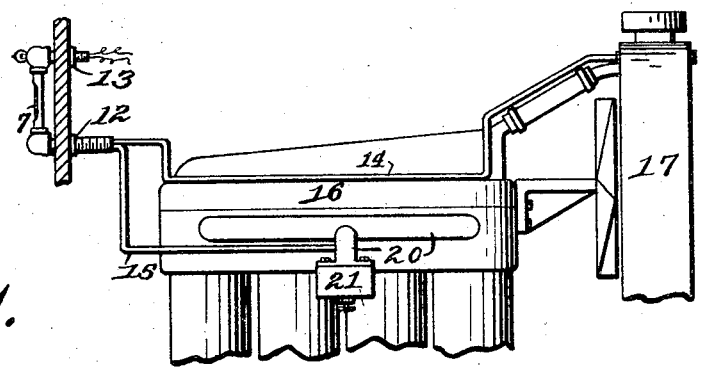

In the drawings forming a part of this application Figure 1 is a diagrammatic side elevation of a portion of an automobile equipped with my device.

Figure 2:
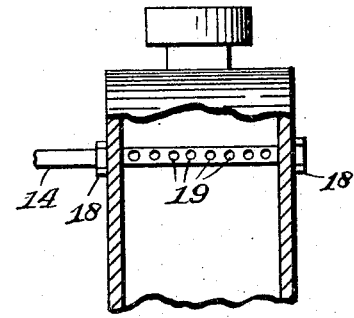
Figure 3:
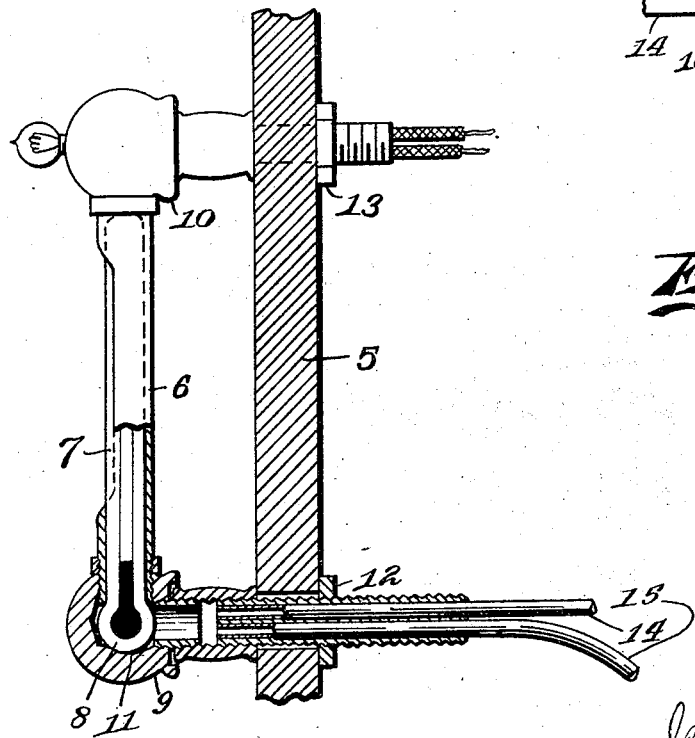

Figures 2 and 3 are enlarged details of certain of the parts of my device.

Referring to the drawings 5 is the front dash of an automobile to which casing 6 is attached. Casing 6 is preferably tubular with one side partly cut away to disclose the transparent stem 7 of a temperature indicating device. On the lower end of stem 7 is bulb 8 which contains the temperature indicating element. Bulb 8 and stem 7 may be an ordinary thermometer element. The ends of casing 6 are preferably externally screw-threaded and screw into fittings 9 and 10. In fitting 9 is a chamber 11 in which bulb 8 is positioned. Fittings 9 and 10 pass through dash 5 and are held positioned therein by nuts 12 and 13. Secured in the end of fitting 9 in any desired manner are the ends of small pipes 14 and 15 which open into chamber 11. Pipe 14 runs down to and across the casing 16 of the engine cylinders and thence to and opens into the radiator 17 above the water line. It may run across the radiator as shown in Figure 2 and have nuts 18 thereon to attach it to the radiator and have perforations 19 therein within the radiator as this is a simple and secure way of fastening the pipe to the radiator. If desired the end of the pipe could open into the radiator but in such case it would be necessary to solder the pipe to the radiator which does not make as secure an attachment as the nuts. Pipe 15 runs to casing 16 and then to and opens into the intake pipe 20 which leads from the carbureter 21 to the cylinders. It will be understood that stem 7 and pipes 14 and 15 are packed so that no air can enter chamber 11 except through pipe 14.

*Operation.*

When the engine is started the suction of the cylinders draws air from the radiator through pipes 14 and 15. When the engine heats up and steam is formed in the radiator the steam is drawn through pipe 14, chamber 11 and pipe 15 and enters the cylinders with the fuel from the carbureter thus preventing to a certain extent the formation of carbon in the cylinders and also making a better fuel mixture. As the steam passes through chamber 11 it comes into engagement with bulb 8 and causes the temperature element to rise in stem 7. Should the temperature of the engine be above the danger point that fact is shown by the rise of the temperature element in stem 7.

Having described my invention I claim:

1. A motormeter comprising a casing; a bulb having a transparent stem connected thereto; a temperature element in said bulb; means to mount said bulb and stem upon the dash of an automobile; said mounting means having a chamber therein surrounding said bulb; a pipe opening into said chamber and adapted to be connected to the radiator of an automobile engine above the water line; a pipe opening into said chamber and adapted to be connected to the intake pipe leading from the carburetor to the cylinders of an automobile engine.

2. A motormeter comprising a fitting having a chamber therein, said fitting being adapted for attachment to the dash of an automobile; a thermometer bulb and stem mounted upon said fitting with the bulb in the chamber; a temperature element in said bulb; two pipes connected to and opening into the chamber of said fitting, one of said pipes being adapted for connection to the radiator above the water line and the other to the intake pipe leading to the cylinders of an automobile engine.

3. A motormeter comprising a tubular casing having a portion cut away; fittings connected to said casing adapted for attachment to the dash of an automobile, one of said fittings having a chamber therein; a bulb in said chamber; a transparent stem connected to said bulb and projecting into said casing; a temperature element in said bulb; a pipe connected to the fitting having the chamber and adapted for connection to the radiator of an automobile engine above the water line; another pipe leading from said chamber and adapted to be connected to the intake pipe of the engine.

In witness that I claim the foregoing I have hereunto subscribed my name this 20th day of April, 1923.

JAMES M. BRENNAN.